(No Model.)
W. P. MERRILL.
REIN HOLDER.
No. 245,305. Patented Aug. 9, 1881.
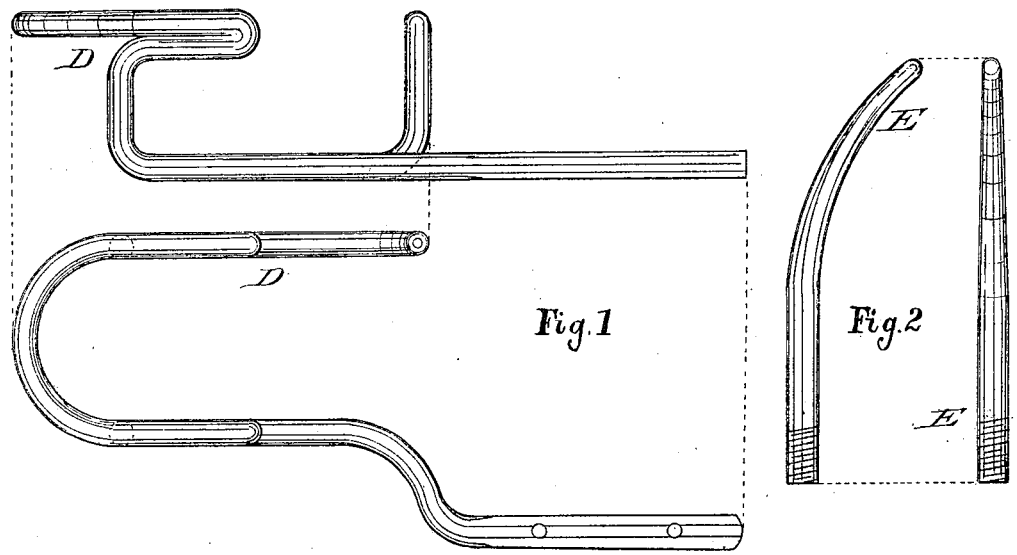
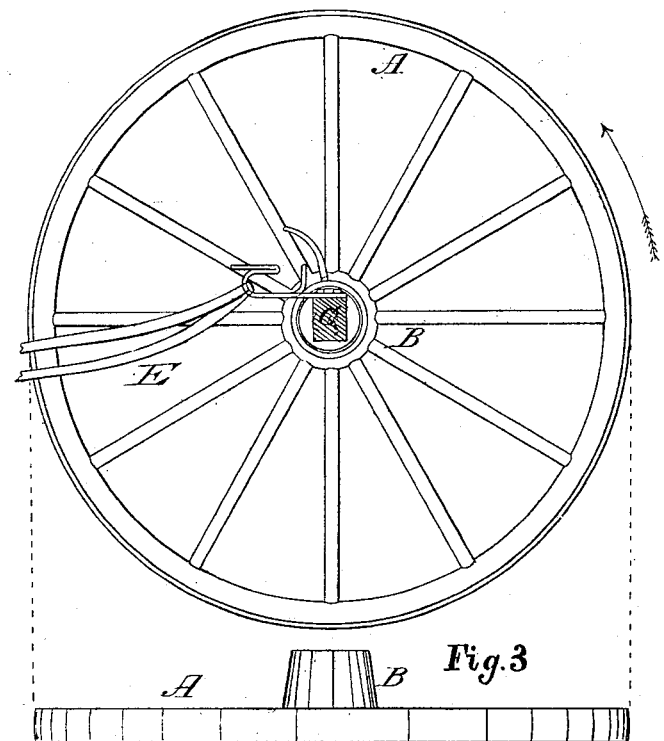
Attest:
Matt. F. Johnson
D. E. Alexander
Inventor:
Wilbur P. Merrill

UNITED STATES PATENT OFFICE.

WILBUR P. MERRILL, OF FLORIN, CALIFORNIA.

REIN-HOLDER.

SPECIFICATION forming part of Letters Patent No. 245,305, dated August 9, 1881.

Application filed March 18, 1881. (No model.)

*To all whom it may concern:*

Be it known that I, WILBUR P. MERRILL, a resident of the town of Florin, Sacramento county, State of California, have invented a new and useful Improvement in Rein-Holding Devices for Preventing Horses from Running Away, of which the following is a specification.

My invention relates to that class of horse-holding devices by which the forward movement of the wheel of a vehicle is made to cause a tightening of the reins and prevent any extended progress of the horse or horses attached, and its objects are to furnish a simpler, cheaper, and more reliable appliance of this character than any now known and in use. This I accomplish by means of a compound or double-bended hook attached to the axle of the vehicle, and a spine or spur set in the hub-band of the wheel adjacent, the operation of which is fully illustrated in the accompanying drawings.

Figure 1 embraces a side and top view of the hook detached. Fig. 2 shows similar views of the spine or spur, and Fig. 3 shows a wheel and post of an axle with these appliances in place with the reins attached.

Like letters of reference indicate like parts.

A represents the wheel; B, the hub; C, the axle; D, the hook; E, the spur, and F the reins. By these it will be readily seen that any forward rotation of the wheel would cause the spur to pass through the bight of the reins and wind them upon the hub in such manner as to render it impossible for the team to proceed.

I am aware that United States Patents Nos. 63,344 and 155,651 embrace devices for a similar purpose; but in the former there is a complication of parts, rendering it more intricate and expensive as well as essentially different in character, and in the latter provision is made but for a single-horse vehicle, and an extra and entirely separate rein is required. I do not, therefore, claim either the pinion, shaft, ratchet, or pawl of the one, or the convex disk, check-rein, and loop of the other, but rely upon the simpler, cheaper, and more efficient hook and spur above described, and also on the fact that the same lines used in driving are employed, and no extra line or lines, rein or reins, are necessary to accomplish the desired result.

Having thus fully described my invention, what I claim as new, and desire to secure by Letters Patent, is—

The combination of the compound or double-bent hook D and spur E with the wheel A, hub B, axle C, and reins F, all constructed, arranged, and operating substantially as shown and described, for the purpose set forth.

WILBUR P. MERRILL.

Witnesses:
MATT. F. JOHNSON,
D. E. ALEXANDER.